July 6, 1943.　　H. S. BAMFORD　　2,323,513
CONTINUOUS PROJECTOR
Filed Aug. 14, 1940　　3 Sheets-Sheet 1

FIG. I

INVENTOR
HARRY S. BAMFORD
BY
ATTORNEY

July 6, 1943.  H. S. BAMFORD  2,323,513
CONTINUOUS PROJECTOR
Filed Aug. 14, 1940  3 Sheets-Sheet 2

INVENTOR
HARRY S. BAMFORD
BY
ATTORNEY

July 6, 1943.　　　H. S. BAMFORD　　　2,323,513
CONTINUOUS PROJECTOR
Filed Aug. 14, 1940　　　3 Sheets-Sheet 3

INVENTOR
HARRY S. BAMFORD
BY
ATTORNEY

Patented July 6, 1943

2,323,513

UNITED STATES PATENT OFFICE 2,323,513

CONTINUOUS PROJECTOR

Harry S. Bamford, Fort Wayne, Ind., assignor to Farnsworth Television and Radio Corporation, a corporation of Delaware Application August 14, 1940, Serial No. 352,576

2 Claims. (Cl. 88—16.8)

This invention relates to continuous projectors for motion picture films, and particularly to such projectors as applied to teleciné operation, that is, to the projection of motion picture films for television transmission, such as also described in copending application Serial No. 352,575, filed August 14, 1940. The present application is a continuation in part of application Serial No. 260,077, filed March 6, 1939.

In the ordinary type of motion picture projectors the film is moved past the film gate and lens system intermittently, the film being held stationary for an instant, while each frame is projected, and then being occulted by a shutter while it is jerked forward into position for the projection of a succeeding frame. The shutter is usually a rotating disc which revolves at a speed equal to the frame frequency of projection of the film, and has a plurality of sectors removed to form the apertures through which the film is projected. The sectors remaining in the disc form the blades of the shutter, a plurality of such blades being provided in order to increase the frequency of occultation of the projecting beam to a point where the interruptions cease to register upon the eye as flicker.

In projectors of the continuous type no such intermittent motion is used; the film is moved past the gate at a uniform speed and some optical method is used comprising moving elements which compensate and neutralize the motion of the film and maintain the images of successive frames stationary in space.

Many types of compensating optical systems have been proposed and used to some extent in the past, comprising various types of moving mirrors, prisms, or lenses; the moving elements usually being mounted on discs, drums, or cones. Also, most systems use the compensating elements for only a very small portion of their travel, and rely upon the close approximation between the sines of small angles and linearity to give the required accuracy of compensation. Ordinarily, no shutter is used with these devices, the successive frames of the film dissolving in and out of view as they pass over the gate.

Continuous projectors are, in theory, extremely attractive, since they avoid the wear and tear upon the film due to the sudden stopping and starting at each frame; they avoid the interruption of the shutter between and during frames, and thereby apparently increase the effectiveness with which the available light is used; and particularly, where the film carries a sound track, they avoid the necessity of isolating the loop of film from which the sound takeoff occurs, by a carefully filtered drive, from the motion of the rest of the film. In practice, however, they have not met with much success for several reasons.

The compensation of the film movement may not be accurate, either because the sinusoidal correction does not approach sufficiently closely to linearity or because of difficulty in adjusting the many required optical elements with sufficient exactitude. The device may not, as it is intended to, eliminate flicker, either because of change in effective aperture of the optical system during various phases of its motion, or because the illumination of said aperture varies, or because there may, at some instant be two or more superimposed images of successive frames on the screen, while at another instant only a single image is projected. Furthermore, some of the compensating systems are extremely complicated and subject to wear, so that even if the adjustment be perfect when the device is new it becomes unsatisfactory after a short amount of use.

For the television transmission of motion pictures, however, continuous projectors are highly desirable and, in many cases, are a practical necessity. Present standards of transmission in the United States demand the transmission of pictures at thirty frames per second, interlaced, so that the entire area of the picture must be covered by the scanning beam in one sixtieth of a second. Standard motion picture film is made at the rate of twenty-four frames per second. This is equivalent to two-and-one-half television scansions for each frame. Since the television field is illuminated only one point at a time, if the motion picture frame were changed in the midst of a scansion the field would be dark during the period that the motion picture frame was changing, which would cause a dark band across a portion of the television field. One way to avoid this is to scan one motion picture frame twice and the next one three times, and this is quite feasible for certain types of television apparatus. With other types, however, the changing of motion picture frames occupies a greater period than that between television scansions.

If a continuous projector be used, these difficulties largely disappear, but new ones take their place. Since interlaced scanning is used, it is necessary that the scanned image remain stationary to within an accuracy of less than one-half of one scanning line movement, or, with the four hundred and forty-one line scanning which is now standard, to within approximately one-eighth of one per cent. Where a motion picture image is viewed directly by the eye small variations in brilliancy over the frame period are not important, since flicker is a function of contrast. For television purposes, however, small variations in brilliancy become extremely important since the portion of the field scanned when the brilliancy is low will appear darker than those portions scanned when the brilliancy is high, and there will appear alternate light and dark stripes across the picture field.

With these facts in mind, the broad purpose of my invention is to provide a continuous projector for motion picture film which is satisfactory for television use, and specific objects of my invention are:

To provide a projector wherein the variation of illumination of the field is undetectably small even under the rigorous requirements of television;

To provide a projector wherein no detactable variation of illumination occurs in the transition from one motion picture frame to the succeeding one;

To provide a projector wherein the transition between frames occurs in a time greatly less than the frame period;

To provide a projector which may be used either for scanning by the alternate 2—3 method or may be used for scanning successive frames two-and-a-half or any other fractional number of times without interfering with the received picture;

To provide a projector wherein the "jump" or motion of the image throughout its phases of projection is negligibly small;

And to provide a projector which is also applicable to theatre as well as teleciné use.

This invention possesses numerous other objects and features of advantage, some of which, together with the foregoing, will be set forth in the following description of specific apparatus embodying and utilizing the novel method. It is therefore to be understood that the method is applicable to other apparatus, and that it is not limited, in any way, to the apparatus of the present application, as various other apparatus embodiments may be adopted, utilizing the method, within the scope of the appended claims.

Referring to the drawings.

Figure 1:
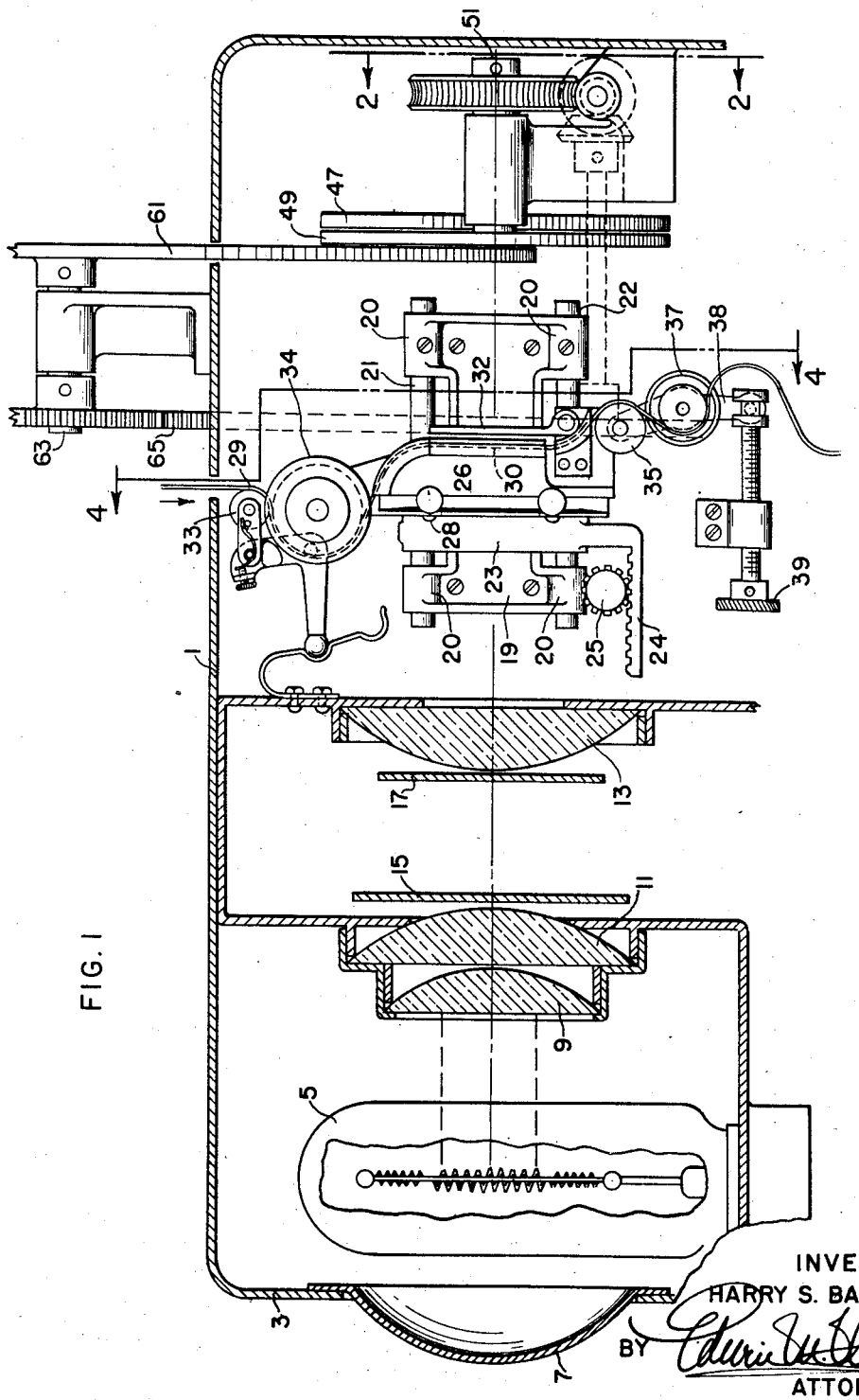
Fig. 1 is an elevation, partly in section, of a projector incorporating the essential elements of this invention, those portions of the projector which are conventional in form being merely indicated.

Considered broadly this invention comprises a projector employing a source of illumination and a condensing system which focuses an image of the source substantially at the optical center of a projecting lens or lenses comprised in a moving optical system for compensating the motion of a film to hold the image steady. Means are provided for maintaining the total illumination through the aperture of the projecting system constant throughout the period of projection of each frame of the motion picture film, irrespective of the position or phase of motion of such frame, a preferred method of doing this comprising changing the effective aperture of the projecting lens in such manner that the effective aperture varies inversely as the brightness of the portion of the image of the light source through which it is passing. Means are provided for passing the motion picture film through the path of the illumination between the source and lens system at a constant speed, this passage taking place over a film gate which is large enough to embrace more than one complete frame of the film, and the motion of the projecting lens system is so correlated with the motion of the film that throughout its passage across the gate the image of each frame is sensibly stationary in space and exactly superposed upon the position of the images of the preceding and succeeding frames. Mounted for movement in consonance with the film and the optical system is a shutter which is arranged to occult one element of the optical system as viewed simultaneously and from the frame at the same rate at which it exposes a succeeding element. A preferred form of optical system comprises a pair of lens discs overlapping at their edges and each disc carrying a plurality of lens elements which align with the elements carried by the other disc, throughout the position of overlap, to form compound lenses. If these lens elements be arranged so that they are in exact alignment at the limits of their active travel, that is, to be in exact alignment at the instant at which their apertures are disclosed or occulted by the shutter, they will be slightly out of alignment between these points, thereby cutting down the effective aperture of the lens. By using an ordinary incandescent projector lamp as a source of illumination, the image of the source formed by the condensing lens at the optical center of the projecting lenses will be slightly brighter at its center than at its edges, and this may be made to compensate for the difference in aperture so that the total light passed is the same throughout the period at which any lens is disclosed. With the arrangement described the preferred form of shutter is a spirally apertured disc which makes one revolution during the passage of an integral number of the motion picture frames, and has a number of apertures which is equal to the number of frames per revolution. The pitch of the spiral of each aperture is such that it follows the lens motion, and adjacent aperture ends center on the same radius of the disc so that one aperture is occulted at the same instant that the succeeding one is disclosed. This insures that the occultation and disclosure will occur at substantially the same rate, but because of the different radii upon which the aperture ends center, the occultation or disclosure of the outer aperture will occur at a higher rate of speed than the inner one. It is therefore preferable to so form the end of the outer aperture, by setting it at an angle with the radius of the shutter, that the speeds of occultation and disclosure are substantially identical The invention will better be understood by direct reference to the drawings; wherein a frame 1 carries a lamphouse 3 of conventional construction. Within the lamphouse is mounted a projection lamp 5, behind which is mounted a reflector 7. Opposite the reflector is a condenser system, including lens elements 9, 11 and 13. Between the lenses of the condensing system are positioned a hand-operated dowser 15 and a fire-shutter 17. All of these elements are well known in the art, and are substantially standard. They are therefore shown diagrammatically and no details of operation of the dowser or fire-shutter are shown.

Supported by the frame on a level with the axis of the condenser is a bracket 19 which carries sliding bearings 20—20, and in these bearings fit the rods 21—22 to which the film gate assembly is secured. The latter comprises a base-frame 23, carrying a rearwardly projecting rack 24 which engages a focusing pinion 25 for moving the entire assembly longitudinally of the projector and thus determining not only the focus of the film but also the best compensation of its motion, as will be hereafter described.

The gate proper, 26, is mounted on a circular track 27, centering on the optical axis of the projector. Adjusting screws 28 permit the gate to be rocked slightly on this track and thus align the film 29 with the gate and limit or compensate any tendency to side play.

The film runs in a recess 30 in the gate, and is held flat as it passes over the gate aperture 31 by a pressure pad 32, which is hinged at the bottom of the gate and held in position by a spring (not shown) enclosed within the hinge.

The film is delivered from a feed reel above the projector and received on a take-up reel below, neither of these reels being shown as their mechanisms are well known and they are merely ancillary to the instant invention. Coming off of the feed reel it passes under a small pressure roller 33, around a guide roller 34, and thence over the gate. Leaving the gate it traverses a framing roller 35 before it reaches the drive sprocket 37, from which it passes to the take-up reel.

The roller 35 is mounted on a pivoted arm 38 whose position is adjustable by means of thumb-screw 39. In this manner a longer or shorter length of film can be included between the positioning teeth of the drive-sprocket 37 and the gate aperture, so that the projected pictures can be properly framed.

The gate aperture 31 is of frame width but of greater than frame height. If the projector is to be used for direct viewing the gate should be two full frame lengths in height, so that each frame will be fully visible at the start of the frame period and remain so while it travels its own length. For television use the gate need not be so high. Where the scanning field frequency is 60 cycles per second, as it is with a television frame or repetition frequency of 30 with a 2 to 1 interlace, a 24 frame per second film will advance ⅖ or 0.4 of a frame length for each scansion. Scanning starts at the top of the picture and hence it is only necessary that the bottom be fully disclosed at the end of the first scansion so that at the beginning of that scansion the leading edge of the frame need only have advanced 0.6 of a frame length beyond the top of the gate. With neither 2½—2½ nor 3—2 scanning is the leading edge of a frame ever scanned more than 3 times, and as soon as it has been scanned the third time it may pass out of the gate. It is necessary, therefore, to add to the 0.6 frame-length height of the gate required at the beginning of the first scansion the distance the film will advance during two complete scansions, or 0.8 of the frame length, giving for the total gate height required 1.4 frame lengths, as against 2 frame lengths for direct viewing or 2.0 or 2.2 frame lengths if the entire frame were to be exposed throughout 2½—2½ or 3—2 scansion, respectively. Curtailment of the aperture height in this manner permits all of the illumination from the source to be concentrated upon the smaller gate, and this represents a saving in heat on the film of thirty per cent in the case of 2½—2½ scansion and over forty per cent in the case of 3—2 scansion. With the smaller gate the image will exhibit flicker when viewed directly, but the television image will not.

The optical system comprising the moving projecting lenses which form the images of the film and compensate the motion thereof so as to hold those images stationary in space, is mounted forward of the film gate and its focusing system. The optical system comprises two lens discs 47, 49, which are mounted on parallel shafts 51, 53, each driven by a worm wheel 55 from a worm carried on a transfer shaft 57, which is driven in synchronism with the main film drive, as will be described in detail below. Each lens disc carries a plurality of lens elements 59 (in the case shown, twenty-four lens elements), circularly arranged and set together as closely as possible. Each lens element is one-half of a compound lens, and the edges of the two lens discs overlap so that the elements of the two discs align at a phase in their travel. The lens discs rotate in opposite directions, and the spacing of the axes of the discs is preferably such that the rotation of the discs brings the lens pairs exactly into alignment slightly above (in Figs. 2 and 3, 9° of arc) and again, slightly below, the line joining the disc axes. It follows from this that when a pair of lens elements reaches this line, the lens elements are not exactly in alignment but are slightly displaced, thus reducing the effective aperture of the compound lens, the amount of this reduction depending upon the radius of the lens discs.

Figure 6:
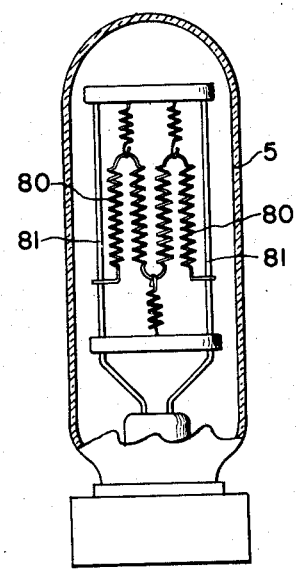
Fig. 6 is a projection lamp having a filament arrangement of conventional type.
Figure 5:
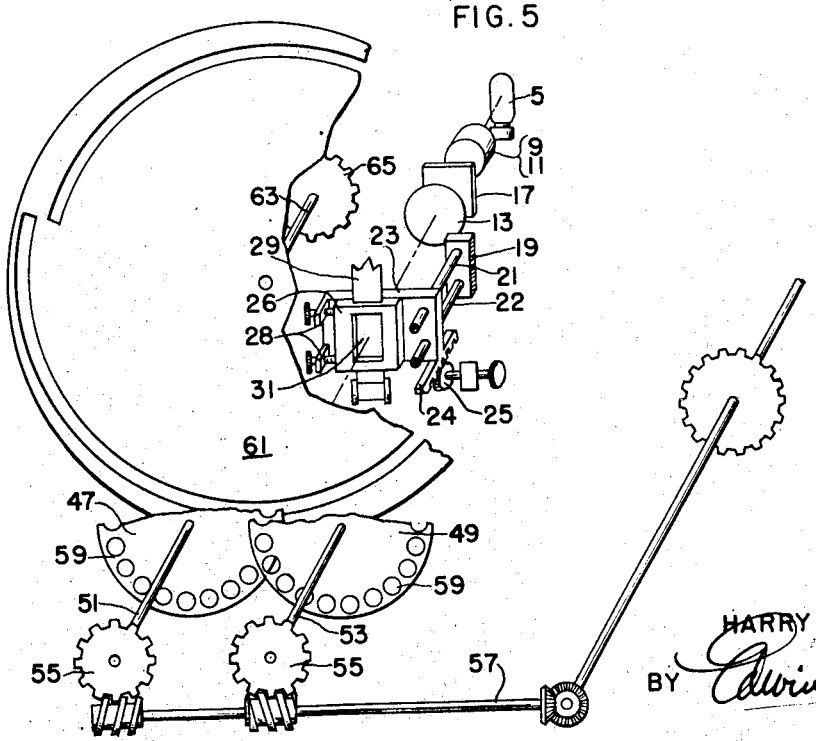
Fig. 5 is a schematic diagram of the drive mechanism.

As has already been explained, the source of illumination used is preferably the standard type of motion picture projector lamp, such lamps comprising a plurality of vertically arranged coil filaments 80 which are supported at top and bottom, as shown in Fig. 6. Conduction to the supports 81 and greater heat radiation from the ends of the filaments than from their central portions, cool the ends and make the light radiation less from the ends than from the center. Proper choice of the radii upon which the lens elements are set permits the apertures of the lenses to be decreased when they are passing through the image of the central portion of the light source to the same extent that this central portion is increased in brilliancy over the edges, so that the net illumination through the lenses (in the absence of a film in the gate) remains substantially the same throughout the effective length of travel.

The method of compensating film motion accomplished by the pair of lens discs rotating in front of the gate is as follows:

Each of the lens elements in either disc, in the absence of the other, rotating in front of the film gate, would form an image of the gate which would move in an arcuate path. In the portion of this path which is actually used, this motion of the image may be resolved into a horizontal component and a vertical component, the horizontal component being a function of the cosine of the angle between the center of the lens element and the horizontal, and the vertical component being a function of the sine of the same angle. With the two lens discs moving in synchronism and with opposite senses of rotation, the cosine components of these motions exactly cancel each other, whereas the sine components reinforce each other, resulting in a vertical motion of each image, the motion being downward.

The amount of motion of the image depends on the motion of the compound lens and the focal distances of the gate and its image, the relation being that if $M_1$ be the motion of the lens $f_g$ and $f_i$ the focal distances of the gate and image respectively, $M_i$, the motion of the image, will be $$M_i = M_1 \frac{f_g + f_i}{f_g} \quad \text{or} \quad M_i = M_1(1+m)$$

where $m$ is the magnification of the optical system.

In the projector here described there are twenty-four lens elements in each disc 47 and 49, and the device is designed for use with pictures projected at the rate of twenty-four frames per second. Only one of the lens combinations is used for the projection of any one frame, and hence each disc is arranged to rotate at the rate of twenty-four lens elements per second or one rotation per second; that is, sixty revolutions per minute.

The motion of each lens element before the gate while it is in use is through an angle of 2A, and the effective motion of the combination is $r2 \sin A$, where $r$ is the radius of the lens element centers on the discs. If the lens is used for 2½—2½ television scansion $$2A_1 = \frac{2\pi}{24} \text{ radians}$$

but if 3—2 scansion is used the maximum value of A differs for alternate lens combinations, being successively $$1.2 \times \frac{2\pi}{24} = 2A_2$$

and $$0.8 \times \frac{2\pi}{24} = 2A_2'$$

With a 2.3" radius of the circle of lens centers shown, this means that the maximum total effective motion of any lens combination $$M_1 = 2.3 \times 2 \sin A' = 0.7196''$$

The frame length is 0.75", and in the same period its motion will be 1.2 times this length, or 0.9000".

The upward motion of the image of the film across the image of the gate will be the film motion times the magnification, or $$0.9000 \times \frac{f_i}{f_g}$$

For compensation of the over-all film motion this must be equated to the downward motion of the image of the gate, or $$0.9000 \times \frac{f_i}{f_g} = 0.7196 \frac{(f_g + f_i)}{f_g}$$

Solving, $f_i = 3.991 f_g$, that is, the magnification is 3.991:1 for exact compensation of over-all motion under the conditions stated.

Owing to the difference between A and sin A, even for angles as small as those here involved, compensation of over-all motion does not mean that the motion at each instant is perfectly compensated. The motion of the image of the gate will be first slower than the motion of the film across it, will then speed up until it is faster, and will finally decelerate until it is slower again, resulting in a slight "jump" in the image. If it is the over-all motion which is compensated, that is, if the adjustment is such that the image is in its central or mean position at the instants of disclosure and occultation, and midway between these points, the displacement of the image is upward during the first half of the cycle and downward during the last half, the two displacements being equal and a proportion of the frame height defined by $$\frac{A_2 - \sin A_2}{A}$$

If, however, the over-all motion be slightly under-compensated the image will start low, pass through its median position, rise above it and return thereto during the first half of the cycle and repeat the operation in reverse during the last half, ending high. The total movement during each half-cycle of the disclosure will be relatively almost the same as before, but since the movement is both above and below in each half of the cycle the over-all displacement is cut in half.

Since the relative movements of the images of the gate and of the film with respect to the gate are affected differently by the degree of magnification, being proportional to $m+1$ and $m$ respectively, the final degree of compensation can be varied by varying the focal distance between gate and lens. In this manner it is also possible to change the optical compensation to accommodate film shrinkage or other deviations from the normal.

Interposed between the lens disc and the film gate, and closely adjacent to the former, is the periphery of a selector disc or shutter 61, which is mounted upon a shaft 63 and is geared through spur gearing 65 to make one complete revolution in an integral number of frame periods, in this case one revolution for each two frames or 720 revolutions per minute. The selector disc is provided with a spiral aperture or apertures which are equal in number to the frames-per-revolution of the disc, the pitch of the spiral being such that the aperture will follow a pair of lens elements in its movement downward past the film gate. Thus, if the shutter is arranged to make one revolution per frame period the radial pitch of the spiral aperture will be equal to the separation of the centers of the lens elements, while if, as in the present case, the selector disc makes one revolution for each two frame periods, the radial pitch of each of the two spiral apertures will be equal to twice the spacing of the lens elements. But whether the selector disc be provided with one, two or more apertures, the total angle subtended by these apertures is equal to 360°, that is, the apertures do not overlap, and adjacent ends of the apertures or aperture center on the same radius of the selector disc or shutter.

Figure 2:
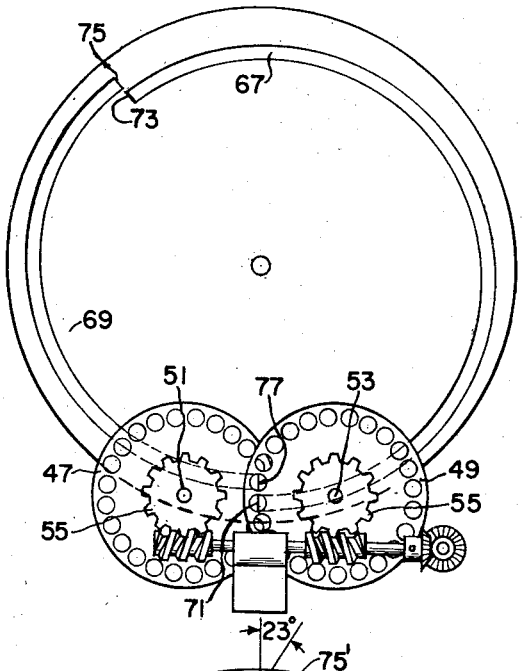
Fig. 2 is a front elevation of the lens discs and shutter of the projector shown in Fig. 1, as adapted for 2—3 scanning taken on line 2—2 of Fig. 1.

Fig. 2 shows a selector shutter adapted for television scanning in accordance with the 3—2 method. This means that one frame is projected for 3/60 of a second while the succeeding frame is projected for but 2/60 of a second. One spiral aperture 67 is accordingly made fifty per cent longer than the other aperture 69, and it is preferable that the spacing of the shaft 63 above the plane of the axes of the lens discs and the position of the longer aperture 67 on the disc be so correlated that the angle between any lens element on the disc above and below the horizontal will be the same at the instants at which that element is disclosed by the leading end of the aperture or occulted by its trailing end, respectively. In one actual projector in which this system is used the spacing of the lens elements on the discs 47 and 49 is 0.6 inch and the maximum effective aperture of the lens combinations is 0.5 inch. The radius of the pitch-line or median line of the aperture 67 at its outermost point 71 is 7.5 inches and the radial pitch, being twice the distance between centers of the lenses in the lens discs, is 1.2 inches, the apertures 67 and 69 being 0.5 inch in width to correspond with the apertures of the lens elements. Since the aperture 67 subtends ⅗ of the circle, or 216°, the radius of the pitch line of its end 73 is 6.78 inches. The pitch radius of the end 75 of aperture 69 is, accordingly, 7.38 inches while the pitch radius of the end 77 of aperture 69 is 6.9 inches.

Figure 3:
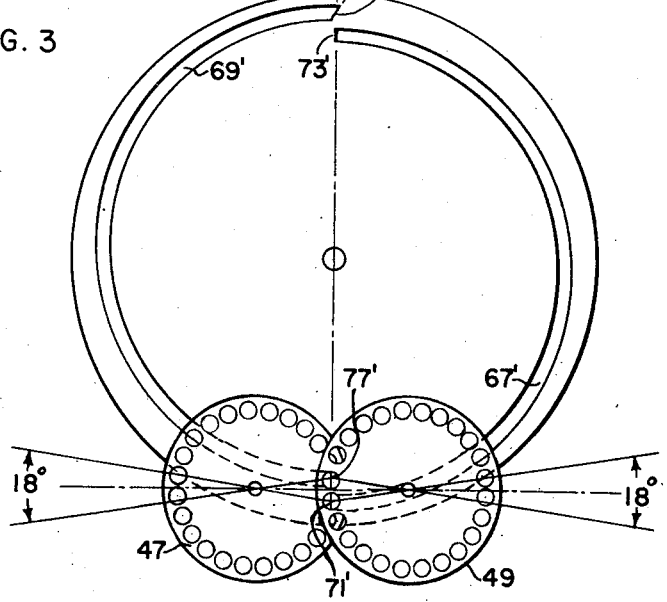
Fig. 3 is a shutter similar to that shown in Fig. 2, but adapted either for theatre use or for 2½—2½ television scanning.
Figure 4:
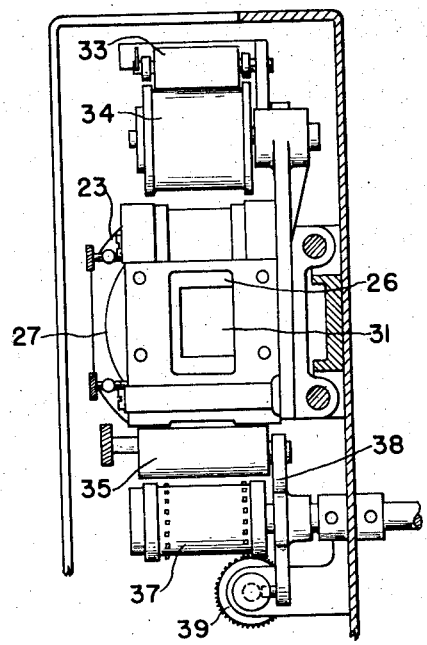
Fig. 4 is a transverse sectional view of the projector showing the film gate, the plane of section being indicated by the line 4—4 of Fig. 1.

Since each aperture end has a slightly different pitch radius, each will take a slightly different time to traverse the aperture of the projecting lens, occulting it or disclosing it as the case may be. The end 71 will occult the lens aperture in 2.12 per cent of the frame period, or .000884 second, while the end 77, simultaneously disclosing the next lens, would require 2.30 per cent of a frame period or .00094 second for its simultaneous disclosure of the succeeding aperture. Semi-disclosure and occultation of each of the two apertures occurs at the same instant when the radius of the selector shutter on which the aperture ends 71 and 77 are formed is vertical. Similarly, the end 75 occults its aperture in 2.155 per cent of the frame period while the end 73 requires 2.34 per cent for the simultaneous disclosure of the succeeding aperture. Since, with this arrangement, the disclosure and occultation takes place between television scansions, during which interval a blanking pulse of ten per cent of the field period or four per cent of the frame period is transmitted, this extremely small difference in the time of occultation and disclosure makes no difference whatsoever, since it is in all cases much shorter than the blanking pulse and no picture transmission takes place while it is occurring.

Where the same projector is used for 2½—2½ scanning, however, the selector shutter is modified as shown in Fig. 3, and the two apertures 67' and 69' are of equal length, each subtending 180°. If such a picture projector be synchronized with the television transmitter so that one transition between lenses occurs between scansions, during the transmission of the blanking pulse, the next transition will occur in the middle of a television scansion. It is therefore necessary to show to what extent the difference in the time required to occult and disclose the respective apertures will affect the illumination through these apertures, since any material variation will result in a light or a dark line or bands across the television picture.

It is clear that the aperture end 71' will come into tangency with its corresponding lens aperture before the end 71', and will have disclosed a segment of this aperture before the end 71' reaches tangency and starts the occultation of the preceding aperture. Similarly, it is clear that each aperture will be half disclosed at the same instant, and that occultation of its aperture by the end 71' will be complete an instant before the end 77' again comes into tangency with the periphery of this aperture and completely discloses it. There will, accordingly, be an instant at the beginning of the transition when the illumination is slightly greater than average, and another instant at the end of the transition when the light is slightly less. Computation shows that the maximum increase or decrease in illumination is only about 2.6 per cent of the average, and this is too small to be detected by the eye as a difference in brightness, particularly as it occurs but once in five scansions. It may, however, appear as a very slight flicker in the center of the picture field, particularly when the brilliance of the field is high, and it is therefore of advantage to make disclosure and occultation occur at precisely the same rate.

Transition occurs most rapidly when the inner aperture end is radial, and it is obviously possible so to shape the outer aperture end 71' so that it will occult its aperture at the same rate as disclosure by the end 77'. An extremely close approximation to this condition takes place when the aperture end 71' is formed at an angle with the radius of the shutter, and intercepting the radius on the pitch line of the spiral apertures. Exact compensation would theoretically require that the ends be curved, but with the ends straight and the angle between the ends and the radius such that its cosine is equal to the ratio of the radius of the pitch line at 77' to the ratio of the pitch line at 71', the variation in illumination through the aperture during the transition is too small to be satisfactorily computed with four-place logarithm tables, and is far too minor to be detected by the eye either as a difference in illumination or as flicker. It is obviously advantageous to form both the ends 71' and 75' in this same manner, so that the television transmitter may be synchronized with either frame. It is even possible, when the ends are so formed, to operate a projector without attempting to synchronize it with the television transmission.

What is claimed is:

1. A continuous projector for motion picture film comprising means for imparting motion to a film, a light source having a non-uniform intensity distribution, means for projecting through said film an image of said light source on a given plane, a pair of movable lens discs disposed substantially in said given plane in such overlapping relation to each other that during the interval of effectiveness of any pair of lenses in said discs, the effective aperture varies the light flux emanating from said light source through said projection means and said lenses inversely with the intensity distribution of said light source and means for selecting successive pairs of lenses in said discs for image projection therethrough during successive intervals of time.

2. In a light projection system, a light source having a non-uniform intensity distribution, means for projecting an image of said light source on a given plane, and a plurality of movable optical systems disposed in said given plane in such overlapping relation to each other that during their interval of effectiveness their effective aperture varies the light flux emanating from said source through said projection means and said optical systems inversely with the intensity distribution of said light source.

HARRY S. BAMFORD.